(12) United States Patent
Suzuki et al.

(10) Patent No.: US 11,026,181 B2
(45) Date of Patent: Jun. 1, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, New Territories (HK)

(72) Inventors: Shoichi Suzuki, Sakai (JP); Wataru Ouchi, Sakai (JP); Tomoki Yoshimura, Sakai (JP); Liqing Liu, Sakai (JP); Kimihiko Imamura, Sakai (JP)

(73) Assignees: SHARP KABUSHIKI KAISHA, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/319,828

(22) PCT Filed: Jul. 26, 2017

(86) PCT No.: PCT/JP2017/027039
§ 371 (c)(1),
(2) Date: Jan. 23, 2019

(87) PCT Pub. No.: WO2018/021404
PCT Pub. Date: Feb. 1, 2018

(65) Prior Publication Data
US 2019/0268854 A1 Aug. 29, 2019

(30) Foreign Application Priority Data
Jul. 27, 2016 (JP) .............................. JP2016-147057

(51) Int. Cl.
*H04W 52/14* (2009.01)
*H04L 27/26* (2006.01)
(Continued)

(52) U.S. Cl.
CPC ......... *H04W 52/146* (2013.01); *H04L 5/0094* (2013.01); *H04L 27/2636* (2013.01);
(Continued)

(58) Field of Classification Search
None
See application file for complete search history.

(56) References Cited

U.S. PATENT DOCUMENTS

2012/0057449 A1* 3/2012 Takaoka ................. H04B 1/713
370/210
2013/0215858 A1 8/2013 Jang et al.
(Continued)

FOREIGN PATENT DOCUMENTS

WO 2014/027573 A1 2/2014
WO 2014027573 A1 2/2014

OTHER PUBLICATIONS

Official Communication issued in International Patent Application No. PCT/JP2017/027039, dated Sep. 5, 2017.
(Continued)

*Primary Examiner* — Gregory B Sefchek
*Assistant Examiner* — Amarnauth G Persaud
(74) *Attorney, Agent, or Firm* — ScienBiziP, P.C.

(57) ABSTRACT

A terminal apparatus transmits uplink information on an uplink physical channel, encodes the uplink information and sets transmission power for the uplink physical channel at least based on a parameter, wherein in a case that a first error correction encoding method is applied to the uplink information, the parameter is given at least based on a product of a first value and a first number of bits before coding per resource element, and in a case that a second error correction encoding method is applied to the uplink information, the parameter is given at least based on a product of a second value and a second number of bits before coding per
(Continued)

resource element, the second value being different from the first value, and the second error correction encoding method being different from the first error correction encoding method.

4 Claims, 7 Drawing Sheets

(51) Int. Cl.
    *H04L 5/00*         (2006.01)
    *H04W 80/08*     (2009.01)
    *H04W 52/18*     (2009.01)

(52) U.S. Cl.
    CPC ........... *H04W 52/14* (2013.01); *H04W 52/18* (2013.01); *H04W 80/08* (2013.01); *H04L 5/0007* (2013.01)

(56) References Cited

U.S. PATENT DOCUMENTS

| | | | |
|---|---|---|---|
| 2013/0223388 A1* | 8/2013 | Bourlas | H04L 5/0055 370/329 |
| 2013/0235838 A1* | 9/2013 | Kim | H04W 52/146 370/329 |
| 2015/0055618 A1* | 2/2015 | Takaoka | H04L 5/0005 370/330 |
| 2015/0124673 A1 | 5/2015 | Ouchi et al. | |
| 2015/0223177 A1 | 8/2015 | Hayashi et al. | |
| 2015/0381209 A1* | 12/2015 | Roh | H03M 13/618 714/755 |
| 2016/0183195 A1* | 6/2016 | Gao | H04W 52/325 455/522 |
| 2017/0331734 A1* | 11/2017 | Cariou | H04L 1/1685 |
| 2019/0159143 A1* | 5/2019 | Li | H04W 74/0808 |

OTHER PUBLICATIONS

ETSI, "LTE; Evolved Universal Terrestrial Radio Access (E-UTRA); Physical channels and modulation (3GPP TS 36.211 version 13.0.0 Release 13)", ETSI TS 136/11, V13.0.0, Jan. 2016, 143 pages.
ETSI, "LTE; Evolved Universal Terrestrial Radio Access (E-UTRA); Multiplexing and channel coding (3GPP TS 36.212 version 13.0.0 Release 13)", ETSI TS 136.212, V13.0.0, Jan. 2016, 123 pages.
ETSI, "LTE; Evolved Universal Terrestrial Radio Access (E-UTRA); Physical layer procedures (3GPP TS 36.213 version 13.0.0 Release 13)", ETSI TS 136.213, V13.0.0, May 2016, 328 pages.
ETSI, "LTE; Evolved Universal Terrestrial Radio Access (E-UTRA); Medium Access Control (MAC) protocol specification (3GPP TS 36.321 version 13.0.0 Release 13)", ETSI TS 136.321, V13.0.0, Feb. 2016, 84 pages.
ETSI, "LTE; Evolved Universal Terrestrial Radio Access (E-UTRA); Radio Resource Control (RRC); Protocol specification (3GPP TS 36.331 version 13.0.0 Release 13)", ETSI TS 136.331, V13.0.0, Jan. 2016, 670 pages.
Ericsson, "5G-key component of the Networked Society", 3GPP RAN Workshop on 5G, RWS-150009, Sep. 17-18, 2015, 55 pages.
Qualcomm, "5G Views on Technology & Standardization", 3GPP RAN workshop on 5G, RWS-150012, Sep. 2015, 21 pages.
"3rd Generation Partnership Project; Technical Specification Group Radio Access Network; Study on New Radio (NR) Access Technology Physical Layer Aspects (Release 15)", 3GPP TR 38.802 V0.0.3, Mar. 2016, pp. 1-19.
Sharp, "Remaining issues on transmit power control for NB-IoT", 3GPP TSG RAN WG1 Meeting #84bis, R1-162837, Apr. 11-15, 2016, 3 pages.
CATT, "PUSCH Power Control in Multi-Beam Configuration", 3GPP TSG RAN WG1 Meeting #89, R1-1707529, May 15-19, 2017, pp. 1-7.
Samsung, "UL SU-MIMO power control and delta_TF setting", 3GPP Draft; R1-106407 UL SU-MIMO Power Control and Delta TF Setting, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; Nov. 15, 2010, Nov. 15, 2010 (Nov. 15, 2010), XP050489881, [retrieved on Nov. 15, 2010] * section 2 *.
Rricsson, "Range and representation of delta_MCS", 3GPP Draft; R1-080881, 3rd Generation Partnership Project (3GPP), Mobile Competence Centre ; 650, Route Des Lucioles ; F-06921 Sophia-Antipolis Cedex ; France, vol. RAN WG1, No. Sorrento, Italy; Feb. 6, 2008, Feb. 6, 2008 (Feb. 6, 2008), XP050109356, [retrieved on Feb. 6, 2008] * section 2 *.
Sharp, "Remaining issues on transmit power control for NB-IoT", 3GPP TSG-RAN WG1#84b R1-162837, Apr. 15, 2016 (Apr. 15, 2016), pp. 1-3, XP051080729.
CATT, "PUSCH Power Control in Multi-Beam Configuration", 3GPP TSG-RAN WG1#89 R1-1707529, (May 19, 2017), May 19, 2017 (May 19, 2017),pp. 1-7, XP051272737.

* cited by examiner

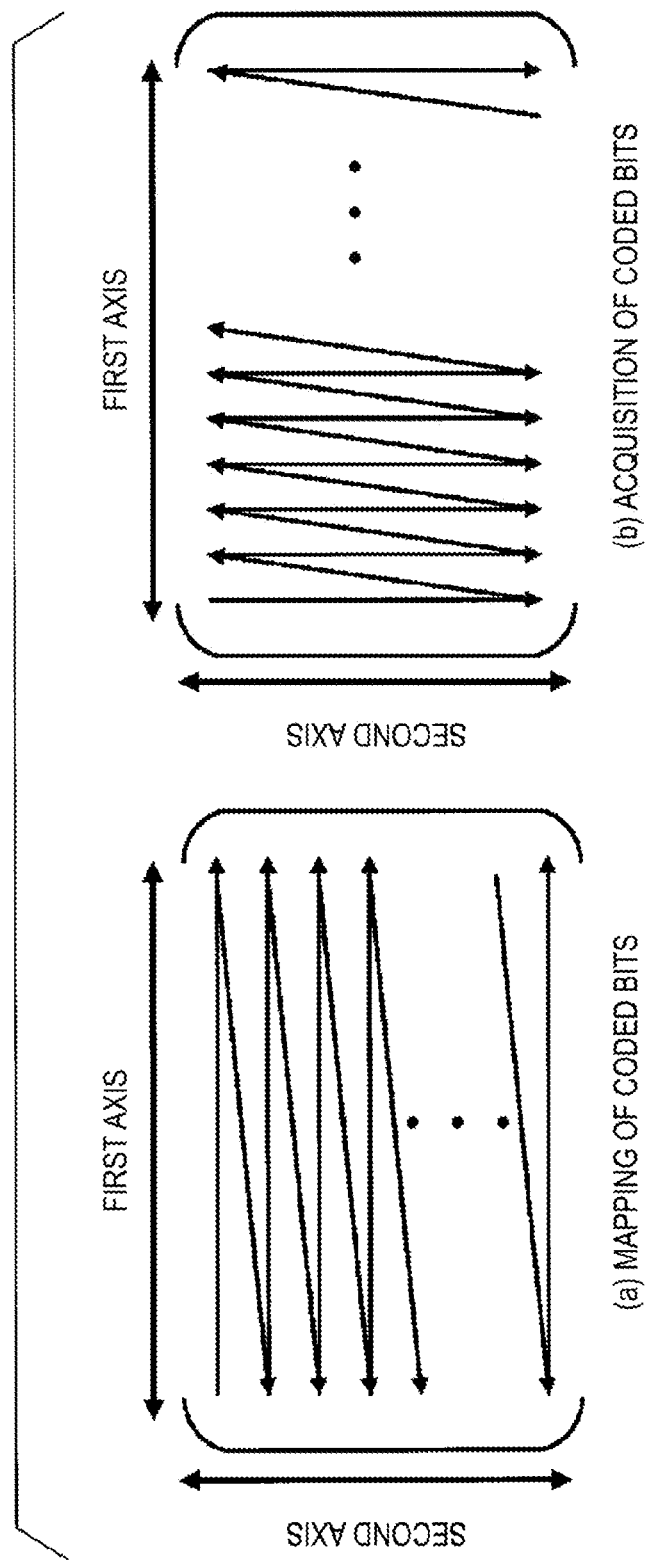

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on Japanese Patent Application No. 2016-147057 filed on Jul. 27, 2016, the contents of which are incorporated herein by reference.

BACKGROUND ART

The 3rd Generation Partnership Project (3GPP) has been working to standardize a radio access method for fourth generation cellular mobile communications (hereinafter, referred to as "Long Term Evolution (LTE, registered trademark)", or "Evolved Universal Terrestrial Radio Access (EUTRA)") (NPLs 1, 2, 3, 4, and 5).

The 3GPP has started to study a radio access method for fifth generation cellular mobile communication (hereinafter, referred to as "NX", or "New Radio (NR)") (NPLs 6 and 7). In the 3GPP, a method through which a base station apparatus transmits NX system information has been studied. Additionally, in NPL 8, an error correction code introduced to the NR has been studied.

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "5G—key component of the Networked Society", RWS-150009, Ericsson, 3GPP RAN Workshop on 5G, Phoenix, USA, 17-18 Sep. 2015.
NPL 7: "5G Views on Technology & Standardization", RWS-150012, Qualcomm, 3GPP RAN Workshop on 5G, Phoenix, USA, 17-18 Sep. 2015.
NPL 8: "3GPP TR 38.802 V0.0.3 (2016-03)", R1-165889, 9 Jun. 2016.

SUMMARY OF INVENTION

Technical Problem

An aspect of the present invention provides a radio communication system by which information is efficiently transmitted, a base station apparatus of the radio communication system, the base station apparatus of the radio communication system, a communication method used for the terminal apparatus, a communication method used for the base station apparatus, an integrated circuit implemented on the terminal apparatus, and an integrated circuit implemented on the base station apparatus.

Solution to Problem (1) According to some aspects of the present invention, the following measures are provided. That is, a first aspect of the present invention is a terminal apparatus, the terminal apparatus includes a transmitter configured to transmit an uplink physical channel including a transport block, and a transmission power control unit configured to set transmission power to transmit the uplink physical channel based on at least a first element and/or a second element described below.

First Element: a signal waveform of the uplink physical channel
Second Element: a subcarrier spacing of the uplink physical channel (2) A second aspect of the present invention is a base station apparatus, the base station apparatus includes a receiver configured to receive an uplink physical channel including a transport block, and a decoding unit configured to decode the transport block, in which transmission power to transmit the uplink physical channel is given based on at least a first element and/or a second element described below.

First Element: a signal waveform of the uplink physical channel
Second Element: a subcarrier spacing of the uplink physical channel (3) A third aspect of the present invention is a communication method used for a terminal apparatus, the communication method includes the steps of transmitting an uplink physical channel including a transport block, and setting transmission power to transmit the uplink physical channel based on at least a first element and/or a second element described below.

First Element: a signal waveform of the uplink physical channel
Second Element: a subcarrier spacing of the uplink physical channel (4) A fourth aspect of the present invention is a communication method used for a base station apparatus, the communication method includes the steps of receiving an uplink physical channel including a transport block, and decoding the transport block, in which transmission power to transmit the uplink physical channel is given based on at least a first element and/or a second element described below.

First Element: a signal waveform of the uplink physical channel
Second Element: a subcarrier spacing of the uplink physical channel

Advantageous Effects of Invention

According to an aspect of the present invention, information is efficiently transmitted between a base station apparatus and a terminal apparatus.

BRIEF DESCRIPTION OF DRAWINGS

FIGS. 7A and 7B are diagrams illustrating an example of coded bits array change by a sub-block interleaver unit 4003 according to the present embodiment.

DESCRIPTION OF EMBODIMENTS

An embodiment of the present invention will be described below.

Figure 1:
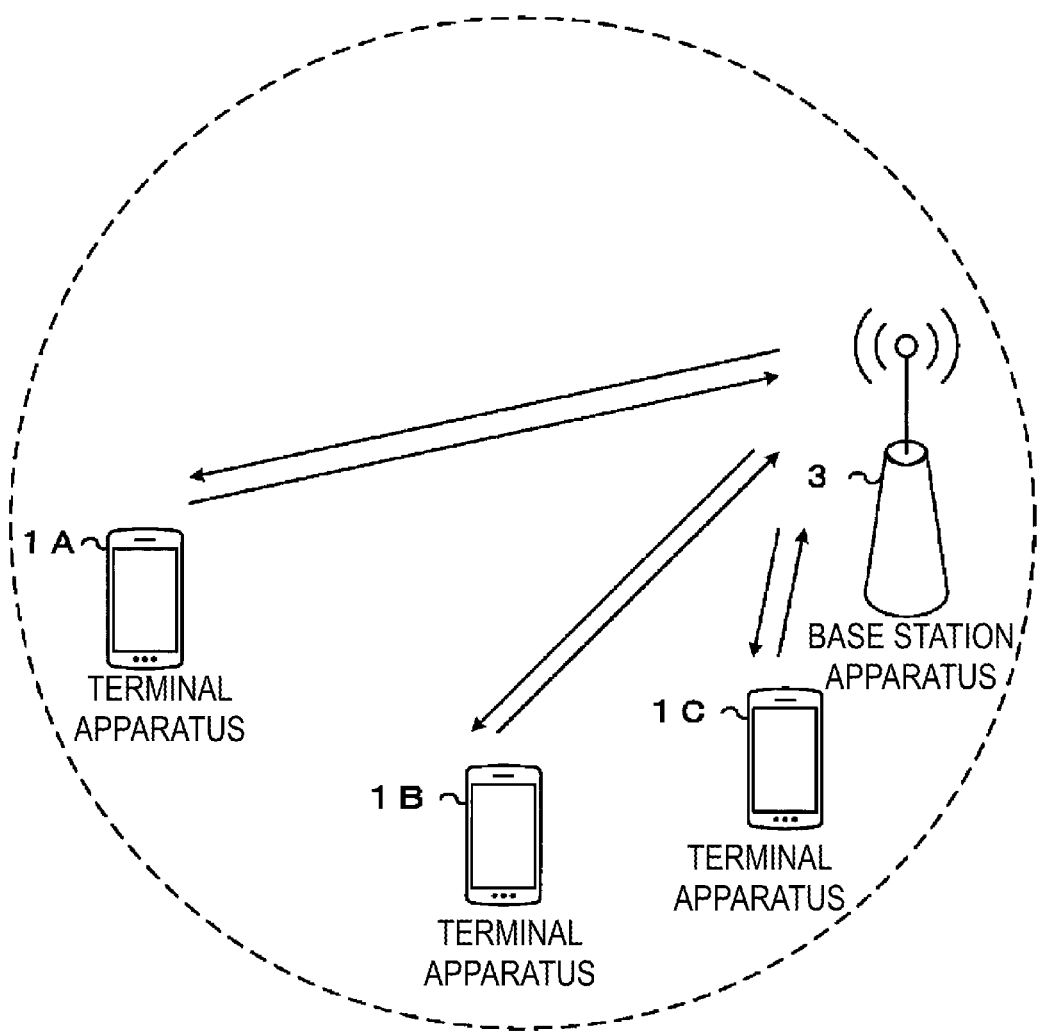
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1A, a terminal apparatus 1B, a terminal apparatus 1C, and a base station apparatus 3. The base station apparatus 3 may include a core network apparatus. The terminal apparatus 1A, the terminal apparatus 1B, and the terminal apparatus 1C are collectively referred to as a terminal apparatus 1. The terminal apparatus 1 and the base station apparatus 3 are also referred to as radio communication devices.

A mode of the terminal apparatus 1 may be changed from RRC_IDLE to RRC_CONNECTED by a connection establishment procedure. The mode of the terminal apparatus 1 may be changed from the RRC_CONNECTED to the RRC_IDLE by a connection release procedure.

The terminal apparatus 1 in the RRC_IDLE may select one cell by a cell selection procedure and camp on the selected one cell.

One or multiple serving cells may be configured for the terminal apparatus 1 in the RRC_CONNECTED. A technology in which the terminal apparatus 1 communicates via the plurality of serving cells is referred to as cell aggregation or carrier aggregation. An aspect of the present invention may be applied to each of the multiple serving cells configured for the terminal apparatus 1. Furthermore, an aspect of the present invention may be applied to some of the multiple configured serving cells. Furthermore, an aspect of the present invention may be applied to each group of the multiple configured serving cells. Furthermore, an aspect of the present invention may be applied to some groups of the multiple configured serving cells. In the Carrier Aggregation, the multiple configured serving cells are also referred to as aggregated serving cells.

The multiple configured serving cells may include one primary cell and one or multiple secondary cells. The primary cell is a cell in which an initial connection establishment procedure has been performed, a cell in which a connection re-establishment procedure has started, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission of multiple physical channels/multiple physical signals in the multiple serving cells (component carriers) to be aggregated. The terminal apparatus 1 can perform simultaneous reception of the multiple physical channels/multiple physical signals in the multiple serving cells (component carriers) to be aggregated.

Figure 2:
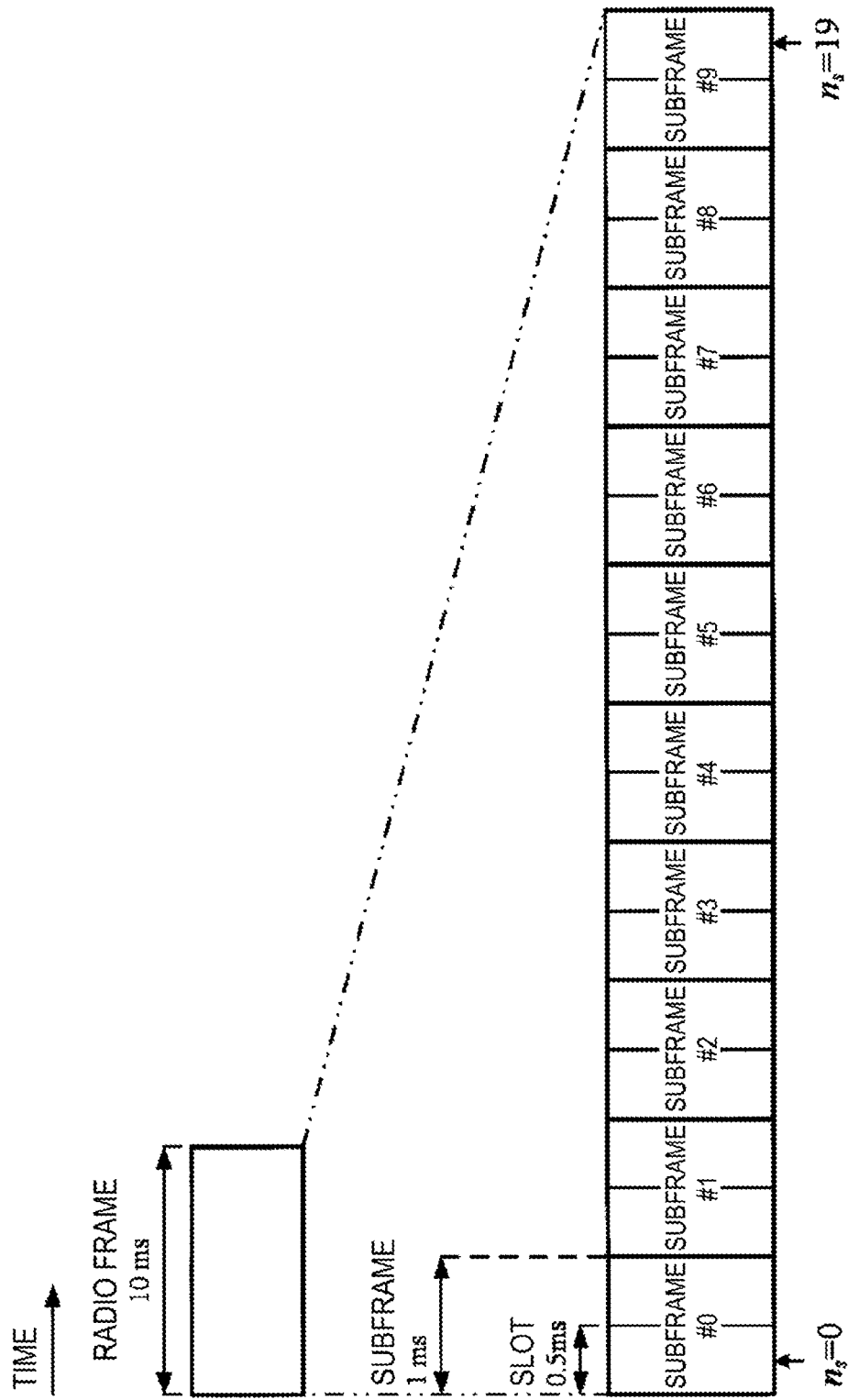
FIG. 2 is a diagram illustrating an example of a structure of a radio frame according to the present embodiment.

FIG. 2 is a diagram illustrating an example of a structure of a radio frame according to the present embodiment. In FIG. 2, the horizontal axis is a time axis.

Each of the radio frames may include ten contiguous subframes in the time domain. Each of subframes i may include two contiguous slots in the time domain. The two contiguous slots in the time domain may be a slot having a slot number $n_s$ of 2i in the radio frame and a slot having a slot number $n_s$ of 2i+1 in the radio frame. Each of the radio frames may include ten contiguous subframes in the time domain. Each of the radio frames may include 20 contiguous slots ($n_s$=0, 1, . . . , 19) in the time domain. The configuration of the radio frame described above may be applied to both the uplink and the downlink.

Figure 3:
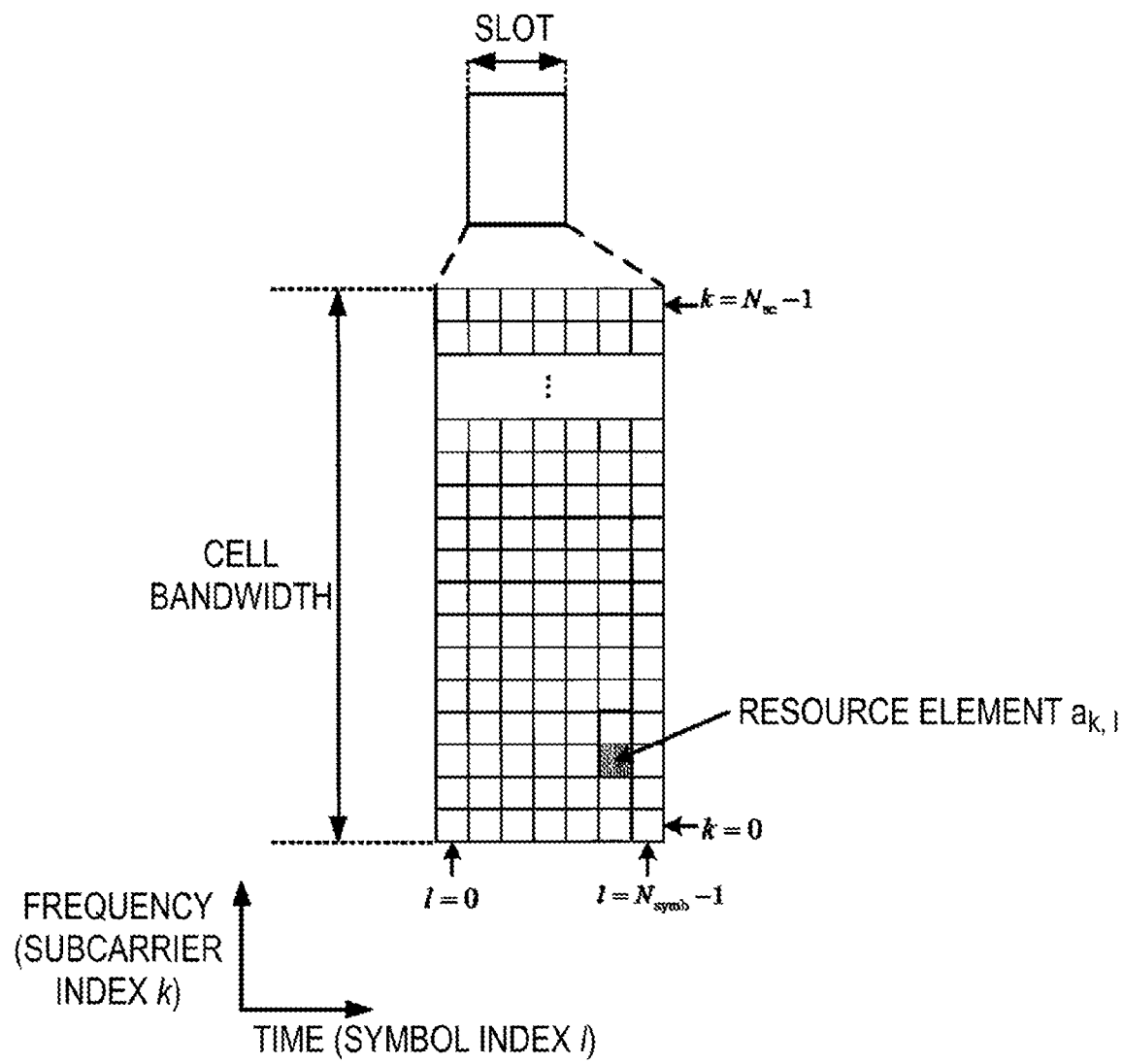
FIG. 3 is a diagram illustrating an overall configuration of a slot according to the present embodiment.

A configuration of a slot according to the present embodiment will be described below. FIG. 3 is a diagram illustrating an overall configuration of the slot according to the present embodiment. FIG. 3 illustrates the configuration of the slot in one serving cell. In FIG. 3, the horizontal axis is a time axis, and the vertical axis is a frequency axis. In FIG. 3, 1 is a symbol number/index, and k is a subcarrier number/index. Here, a symbol may be an Orthogonal Frequency Division Multiplexing (OFDM) symbol or a Single Carrier Frequency Division Multiple Access (SC-FDMA) symbol. $N_{SC}$ is the total number of the subcarriers included in a cell bandwidth. $N_{symb}$ is the total number of symbols included in one slot. $N_{symb}$ may be given based on a subcarrier spacing.

The physical signal or the physical channel transmitted in each of the slots is expressed by a resource grid. The resource grid is defined by multiple subcarriers and multiple symbols. Each element within the resource grid is referred to as a resource element. The resource element $a_{k,1}$ is expressed by the subcarrier number/index k and the symbol number/index 1. In other words, a resource for transmission of the physical signal or the physical channel may be expressed by the resource element.

The resource grid may be defined for each antenna port. In the present embodiment, description is given for one antenna port. The present embodiment may be applied to each of multiple antenna ports.

Physical channels and physical signals in the present embodiment will be described.

In FIG. 1, the following downlink physical channels are used for downlink radio communication from the base station apparatus 3 to the terminal apparatus 1. The downlink physical channels are used by the physical layer for transmission of information output from the higher layer.

NR Physical Broadcast CHannel (NR-PBCH)
NR Physical Downlink Control CHannel (NR-PDCCH)
NR Physical Downlink Shared CHannel (NR-PDSCH)

The NR-PBCH may be used for broadcasting non-demand SI.

The NR-PDCCH is used to transmit Downlink Control Information (DCI) used to schedule the NR-PDSCH, and downlink control information used to schedule a NR Physical Uplink Shared CHannel (NR-PUSCH).

The NR-PDSCH is used to transmit downlink data (Downlink Shared CHannel (DL-SCH)). The NR-PDSCH may also be used to transmit the downlink control information. The NR-PDSCH may also be used to transmit the downlink control information and the downlink data together. The terminal apparatus 1 may decode the NR-PDSCH based on reception/detection of the downlink control information (NR-PDCCH and NR-PDSCH). The terminal apparatus 1 may decode the NR-PDSCH regardless of the reception/detection of the downlink control information (NR-PDCCH and NR-PDSCH).

In FIG. 1, the following downlink physical signals are used for downlink radio communication from the base station apparatus 3 to the terminal apparatus 1. The downlink physical signals are not used for transmission of information output from the higher layer, but are used by the physical layer.

NR Synchronization Signal (NR-SS)

NR Downlink Reference Signal (NR-DL RS)

The NR-SS may be used for a cell search. The cell search is a procedure through which the terminal apparatus 1 acquires time and frequency synchronization with the cell and detects a Physical layer Cell Identity (PCI) of the cell. In the handover procedure, a source cell (base station apparatus 3) may notify the terminal apparatus 1 of the PCI of a target cell. A handover command may include information for indicating the PCI of the target cell. The NR-SS may be periodically transmitted. The NR-SS may also be referred to as a discovery signal (DS).

The NR-DL RS may be used for the terminal apparatus 1 to perform channel compensation on a downlink physical channel of the cell. The NR-DL RS may be used for the terminal apparatus 1 to calculate downlink channel state information of the cell.

In FIG. 1, the following uplink physical channels are used for uplink radio communication from the base station apparatus 3 to the terminal apparatus 1. The uplink physical channels are used by a physical layer for transmission of information output from a higher layer.

NR Physical Random Access CHannel (NR-PRACH)

NR Physical Uplink Control CHannel (NR-PUCCH)

NR Physical Uplink Shared CHannel (NR-PUSCH)

The NR-PRACH is used to transmit a preamble (preamble sequence). The NR-PRACH may be used for a random access procedure. The NR-PRACH may also be used to transmit a system information request. In other words, the system information request may be the preamble.

The NR-PUCCH may be used to transmit the uplink control information. The uplink control information may include Hybrid Automatic Repeat reQuest ACKnowledgment (HARQ-ACK), the channel state information, and a scheduling request. The HARQ-ACK corresponds to the NR-PDSCH (downlink data) and indicates an Acknowledgement (ACK) or a Negative Acknowledgement (NACK). The channel state information is generated based on a received signal and/or a channel. The scheduling request indicates a request of resource allocation of the NR-PUSCH (uplink data).

The NR-PUSCH may be used for transmission of uplink data (UpLink Shared CHannel (UL-SCH), transport block) and/or uplink control information.

An apparatus configuration of the terminal apparatus 1 according to the present embodiment will be described below.

Figure 4:
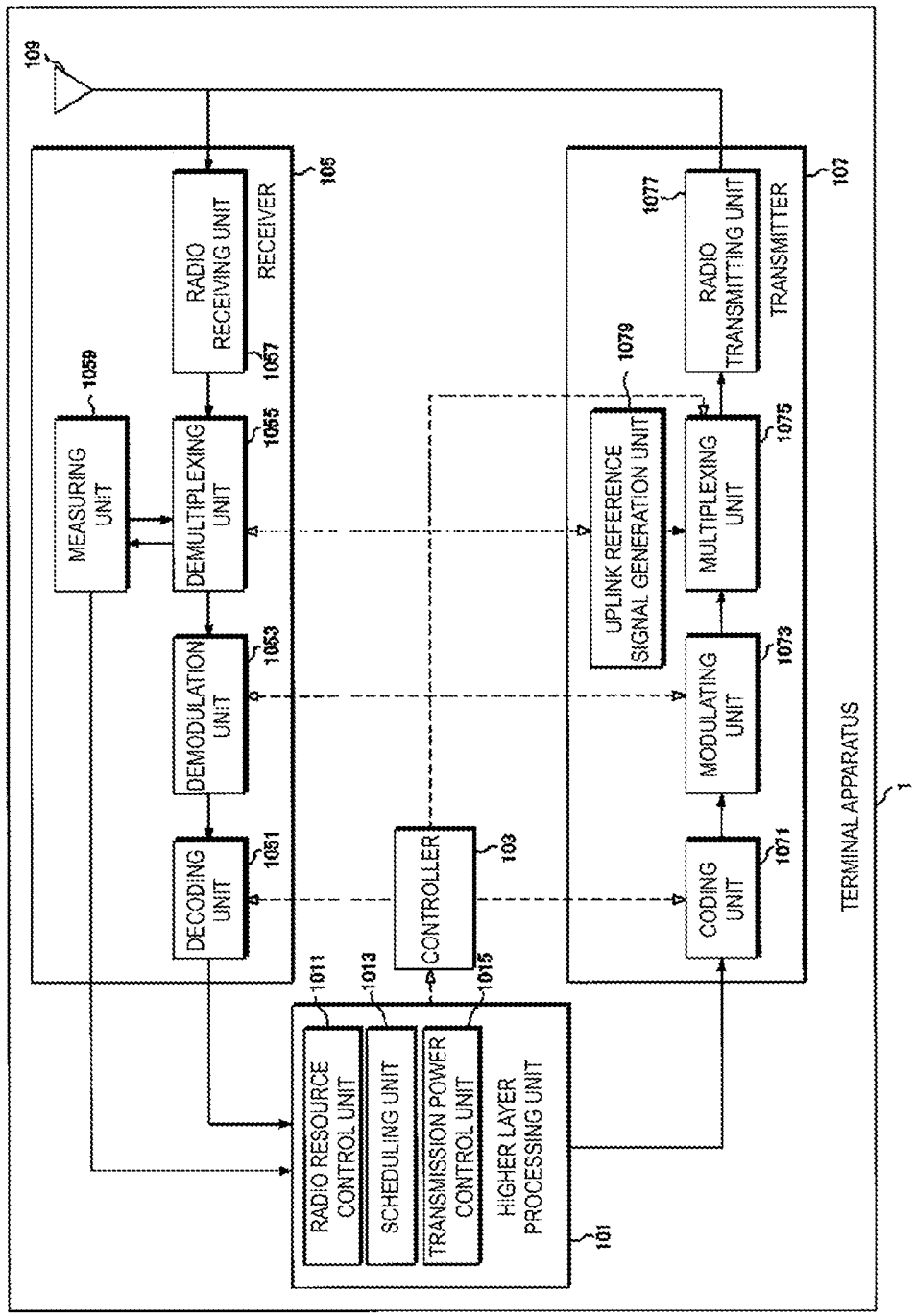
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated in the diagram, the terminal apparatus 1 is configured to include a higher layer processing unit 101, a controller 103, a receiver 105, a transmitter 107, and a transmit and/or receive antenna 109. The higher layer processing unit 101 is configured, including a radio resource control unit 1011, a scheduling information interpretation unit 1013, and a transmission power control unit 1015. Furthermore, the receiver 105 is configured to include a decoding unit 1051, a demodulation unit 1053, a demultiplexing unit 1055, a radio receiving unit 1057, and a measuring unit 1059. The transmitter 107 is configured to include a coding unit 1071, a modulating unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the terminal apparatus 1 itself. Furthermore, the radio resource control unit 1011 generates information to be mapped to each uplink channel, and outputs the generated information to the transmitter 107.

A scheduling unit 1013 included in the higher layer processing unit 101 generates control information for control of the receiver 105 and the transmitter 107 based on the downlink control information received via the receiver 105, and outputs the generated control information to the controller 103.

The transmission power control unit 1015 sets transmission power for transmission of the uplink physical channel. The transmission power control unit 1015 generates control information indicating to the transmitter 107 to transmit the uplink physical channel using the set transmission power and outputs the generated information to the controller 103.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the resulting information to the higher layer processing unit 101.

The radio receiving unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1057 removes a portion corresponding to a Guard Interval (GI) from the digital signal resulting from the conversion, performs Fast Fourier Transform (FFT) on the signal from which the Guard Interval has been removed, and extracts a signal in a frequency domain.

The demultiplexing unit 1055 demultiplexer the extracted signal into the downlink physical channel and the downlink physical signal. Furthermore, the demultiplexing unit 1055 compensates for the channel of the downlink physical channel from a channel estimate input from the measuring unit 1059. Furthermore, the demultiplexing unit 1055 outputs the downlink reference signal resulting from the demultiplexing, to the measuring unit 1059.

The demodulation unit 1053 and the decoding unit 1051 decodes the downlink control information, and outputs, to the higher layer processing unit 101, the downlink data (the transport block) resulting from the decoding. The demodulation unit 1053 and the decoding unit 1051 decode the downlink data (the transport block) in accordance with information of a coding rate notified with the downlink control information and a modulation scheme notified with the downlink control information, and output, to the higher layer processing unit 101, the downlink data (the transport block) resulting from the decoding.

The measuring unit 1059 performs downlink path loss measurement, channel measurement, and/or interference measurement from the downlink physical signal input from the demultiplexing unit 1055. The measuring unit 1059 outputs, to the higher layer processing unit 101, the measurement result and the channel state information calculated based on the measurement result. Furthermore, the measuring unit 1059 calculates the downlink channel estimate from the downlink physical signal and outputs the calculated downlink channel estimate to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and/or receive antenna 109.

The coding unit 1071 performs coding on the Uplink Control Information and the uplink data input from the higher layer processing unit 101. The modulating unit 1073 modulates the coded bits input from the coding unit 1071, in compliance with the modulation scheme such as BPSK, QPSK, 16 QAM, or 64 QAM.

The uplink reference signal generation unit 1079 generates a sequence acquired according to a rule (formula) prescribed in advance, based on a physical cell identity (PCI) (also referred to as a cell ID or the like) for identifying the base station apparatus 3, a bandwidth to which the uplink reference signal is mapped, a cyclic shift notified with the uplink grant, a parameter value for generation of a DMRS sequence, and the like.

Based on the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of the PUSCH. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmitting unit 1077 performs Inverse Fast Fourier Transform (IFFT) on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

An apparatus configuration of the base station apparatus 3 according to the present embodiment will be described below.

Figure 5:
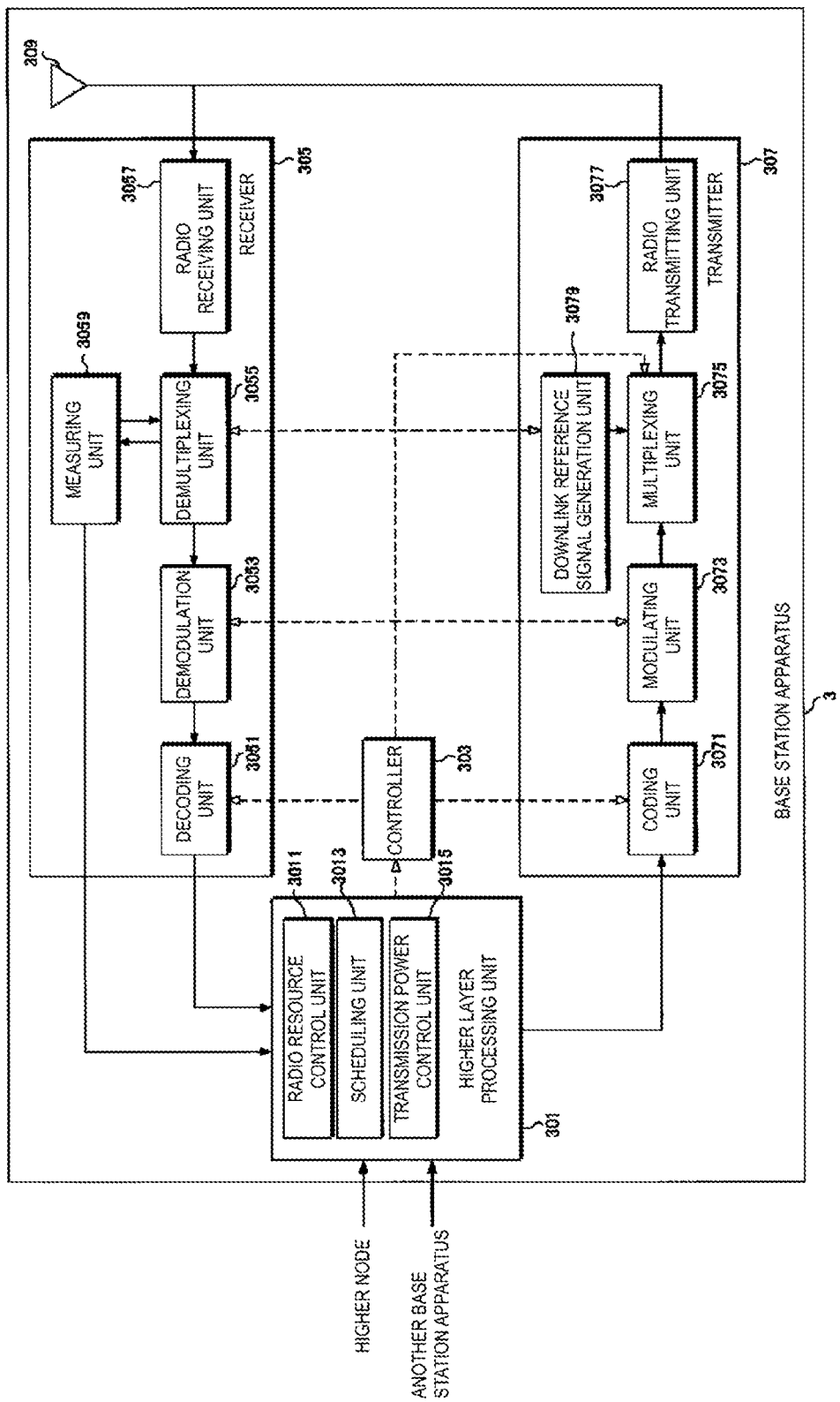
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 is configured, including a radio resource control unit 3011, a scheduling unit 3013, and a transmission power control unit 3015. The receiver 305 is configured to include a decoding unit 3051, a demodulation unit 3053, a demultiplexing unit 3055, a radio receiving unit 3057, and a measuring unit 3059. The transmitter 307 is configured to include a coding unit 3071, a modulating unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channels (the NR-PDSCH and the NR-PUSCH) are allocated, the coding rate and modulation scheme for the physical channels (the NR-PDSCH and the NR-PUSCH), the transmission power, and the like, from the received channel state information and from the channel estimate, channel quality, or the like input from the measuring unit 3059. The scheduling unit 3013 generates the control information in order to control the receiver 305 and the transmitter 307 in accordance with a result of the scheduling, and outputs the generated information to the controller 303. The scheduling unit 3013 generates the information to be used for the scheduling of the physical channels (the NR-PDSCH and the NR-PUSCH) (for example, downlink control information), based on the result of the scheduling.

The transmission power control unit 3015 included in the higher layer processing unit 301 generates transmission power control information (higher layer parameter and/or TPC command) used for setting the transmission power for the transmission of the uplink physical channel. The transmission power control unit 1015 generates control information indicating to the transmitter 107 to transmit the information and outputs the generated control information and the transmission power control information to the controller 103.

Based on the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiving unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 3057 removes a portion corresponding to the Guard Interval (GI) from the digital signal resulting from the conversion. The radio receiving unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiving unit 3057 into the NR-PUCCH, the NR-PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 compensates for channels including the NR-PUCCH and the NR-PUSCH from the channel estimate input from the measuring unit 3059. Furthermore, the demultiplexing unit 3055 outputs an uplink reference signal resulting from the demultiplexing, to the measuring unit 3059.

The demodulation unit 3053 performs Inverse Discrete Fourier Transform (IDFT) on the NR-PUSCH, acquires modulation symbols, and performs reception signal demodulation, that is, demodulates each of the modulation symbols on the NR-PUCCH and the NR-PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same NR-PUSCH with the MIMO SM, based on the number of spatial-multiplexed sequences notified in advance with the uplink grant to each of the terminal apparatuses 1 and information indicating the precoding to be performed on the sequences.

The decoding unit 3051 acquires the uplink data and the uplink control information from the NR-PUCCH and the NR-PUSCH, and outputs the uplink data and the uplink control information to the higher layer processing unit 101. The measuring unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates a downlink reference signal in accordance with the control signal input from the controller 303, codes and modulates an HARQ indicator, the downlink control information, and the downlink data that are input from the higher layer processing unit 301, multiplexes the NR-PDCCH, the NR-PDSCH, and the downlink reference signal, and transmits a result of the multiplexing to the terminal apparatus 1 through the transmit and/or receive antenna 309.

The coding unit 3071 performs coding on the downlink control information and the downlink data input from the higher layer processing unit 301. The modulating unit 3073 modulates the coded bits input from the coding unit 3071, in compliance with the modulation scheme such as BPSK, QPSK, 16 QAM, or 64 QAM.

The downlink reference signal generation unit 3079 generates, as the downlink reference signal, a sequence that is already known to the terminal apparatus 1 and that is acquired in accordance with a rule prescribed in advance based on the physical cell identity (PCI) for identifying the base station apparatus 3, or the like.

The multiplexing unit 3075, in accordance with the number of NR-PDSCH layers to be spatial-multiplexed, maps one or multiple pieces of downlink data to be transmitted on one NR-PDSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmitting unit 3077 performs Inverse Fast Fourier Transform (IFFT) on the modulation symbol resulting from the multiplexing or the like, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

Each of the units in FIG. 4 and FIG. 5 may be constituted as a circuit. For example, the transmitter 107 may be a transmission circuit 107.

Hereinafter, the coding unit 1071 included in the terminal apparatus 1 will be described in detail.

The coding unit 1071 may include a function to convert a transport block (or a data block, transport data, transmission data, a transmission code, a transmission block, a payload, information, an information block, or the like) sent (or notified, delivered, transmitted, handed, or the like) from the higher layer to coded bits through an error correction coding process. For example, the error correction coding includes a Turbo code, a Low Density Parity Check (LDPC) code, a Polar code, a convolutional code (or a Tail biting convolutional code or the like), a block code, a Reed Muller (RM) code, a Reed Solomon code, and an iteration code.

Here, the transport block converted to the coded bits may be coded bits subjected to the error correction coding. In other words, in an aspect of the present invention, the transport block may be subjected to the error correction coding process with an Outer code.

Figure 6:
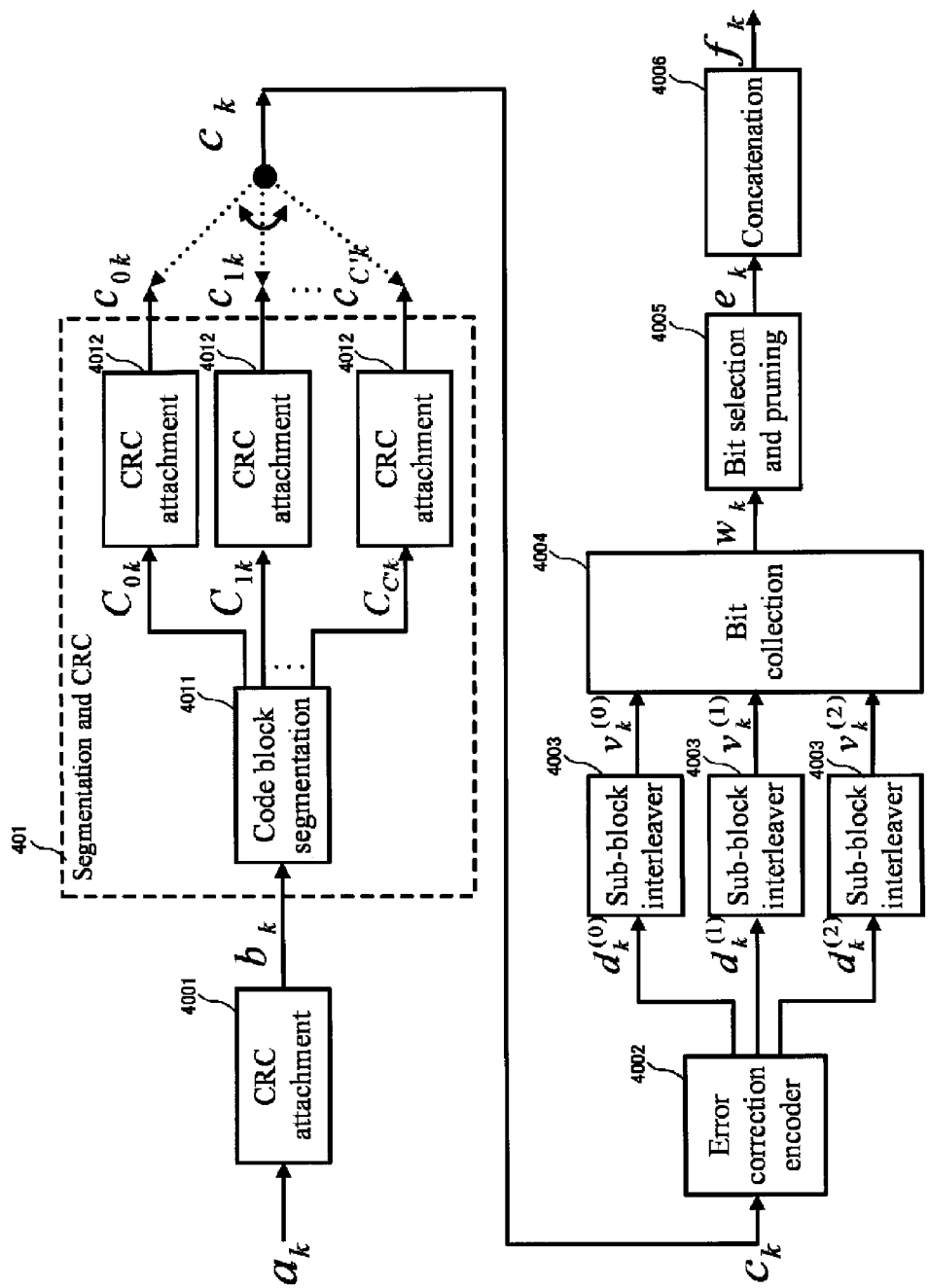
FIG. 6 is a diagram illustrating a configuration example of a coding unit 1071 according to the present embodiment.

FIG. 6 is a diagram illustrating a configuration example of the coding unit 1071 according to the present embodiment. The coding unit 1071 is configured by including at least one of a CRC attachment unit 4001, a Segmentation and CRC unit 401, an Error correction encoder unit 4002, a Sub-block interleaver unit 4003, a Bit collection unit 4004, a Bit selection and pruning unit 4005, and a Concatenation unit 4006. Here, the segmentation and CRC unit 401 is configured by including at least one of a code block segmentation unit 4011 and one or multiple CRC attachment units 4012.

A transport block (also referred to as $a_k$) may be input to the CRC attachment unit 4001. The CRC attachment unit 4001 may generate a CRC bit as a redundant bit for error detection based on the input transport block. The generated CRC bit is attached to the transport block. The transport block to which the CRC bit is attached (also referred to as $b_k$) is output from the CRC attachment unit 4001. In the CRC attachment unit 4001, based on information included in higher layer signaling, the number of the CRC bits attached to the transport block may be given. In the CRC attachment unit 4001, based on information included in a control channel, the number of the CRC bits attached to the transport block may be given. In the CRC attachment unit 4001, based on information configured beforehand, the number of the CRC bits attached to the transport block may be given. In the CRC attachment unit 4001, based on an error correction coding scheme, the number of the CRC bits attached to the transport block may be given.

For example, the CRC attachment unit 4001 may attach the CRC bit to the transport block subjected to the coding with the turbo code, and may not attach the CRC bit to the transport block to which the error correction code other than the turbo code (for example, the LDPC code) is applied. Additionally, for example, the CRC attachment unit 4001 may attach the 24-bit CRC bits to the transport block to which the turbo code is applied, and may attach the CRC bits that are not constituted from 24 bits (less than 24 bits or more than 24 bits) to the transport block to which the error correction code other than the turbo code (for example, the LDPC code) is applied.

For example, $b_k$ may be input to the code block segmentation unit 4011. The code block segmentation unit 4011 may segment $b_k$ into one or multiple Code blocks. For example, in a case that $b_k$ satisfies $b_k > Z$, $b_k$ may be segmented into multiple code blocks. Here, $Z$ is the maximum code block length. The code block segmentation unit 4011 may output C' (C' is an integer of 1 or more) code blocks ($C_{0k}$ to $C_{C'k}$).

The maximum code block length $Z$ may be given based on a transport block size. Here, the transport block size includes a size (or amount) of the transport block (or a data block, transport data, transmission data, a transmission code, a transmission block, a payload, information, an information block, or the like). In other words, the transport block size may be a data block size, a transport data size, a transmission data size, a transmission code size, a transmission block size, a payload size, an information size, an information block size, a data block amount, a transport data amount, a transmission data amount, a transmission code amount, a transmission block amount, a payload amount, an information amount, an information block amount, or the like. The transport block size may include the number of the CRC bits. In other words, the transport block size may be a size of the transport block including the CRC bits. For example, in a case that a certain transport block size $N_{TBS}$ satisfies $N_{TBS} > Z_t$, the maximum code block length $Z = Z_1$ may hold, in a case that $N_{TBS} \leq Z_t$ is satisfied, the maximum code block length $Z = Z_2$ may hold. Here, $Z_t$, $Z_1$, and $Z_2$ may be given based on the information included in the higher layer signaling. Additionally, $Z_t$, $Z_1$, and $Z_2$ may be given based on the information included in the control channel. Additionally, $Z_t$, $Z_1$, and $Z_2$ may be given based on the information configured beforehand. Additionally, the maximum code block length $Z$ of the transport block may be given based on the transport block size and the modulation scheme (QPSK, 16QAM, 64QAM, or the like). Here, being given based on the transport block size and the modulation scheme may be being given based on a ratio of the transport block size to a modulation order of the modulation scheme applied to the transport block (or a value associated with the number of the modulation symbols). The modulation order indicates the number of bits (scramble bits) corresponding to one modulation symbol. The modulation order for the QPSK is 2. The modulation order for the 16QAM is 4. The modulation order for the 64QAM is 6. Additionally, the maximum code block length $Z$ of the transport block may be given based on a ratio of the transport block size of the transport block to the number of resource elements included in a channel including the transport block. Here, the transport block size of the transport block may be expressed by a total of at least one code block size generated from the transport block. Additionally, the number of the resource elements included in the channel including the transport block may be expressed by the number of resource elements allocated to the terminal apparatus 1, given by scheduling information (for example, in a case of downlink communication, it may be a downlink grant. In addition, in a case of uplink communication, it may be an uplink grant). Here, the number of the resource elements allocated to the terminal apparatus 1 may be given by the product of the number of allocated subcarriers and the number of allocated symbols. Additionally, the number of the resource elements allocated to the terminal apparatus 1 may be given as a value obtained by subtracting resource elements included in a prescribed region from the product of the number of the allocated subcarriers and the number of the allocated symbols. Here, the prescribed region may be a region in which a reference signal channel is included. Additionally, the prescribed region may be a region in which a synchronization channel is included.

The maximum code block length $Z$ of the transport block may be given based on a component carrier (or a component carrier bandwidth, a serving cell, a serving cell bandwidth, or the like). For example, the maximum code block length $Z$ of the transport block may be given based on a component carrier for the channel including the transport block. The maximum code block length $Z$ of the transport block may be given based on whether a serving cell for the channel including the transport block is a primary cell or a secondary cell. Here, the primary cell may include a primary secondary cell. Additionally, the secondary cell may include the primary secondary cell. Additionally, for example, the maximum code block length $Z$ of the transport block may be given based on whether or not the serving cell for the channel including the transport block is a primary secondary cell. The maximum code block length $Z$ of the transport block may be given based on whether the serving cell for the channel including the transport block is in a licensed band or unlicensed band. Here, a component carrier of a channel may be a component carrier by which the channel is transmitted. Additionally, a component carrier for a channel may be a component carrier by which the channel is transmitted.

The maximum transport block length $Z$ of the transport block may be given based on a serving cell ID (for example, a Physical Cell ID (PCID), a Virtual Cell ID (VCID), or the like). The maximum transport block length Z of the transport block may be given based on a serving cell ID for the channel including the transport block.

The maximum code block length Z of the transport block may be given based on whether or not frequency hopping is applied. For example, in a case that the frequency hopping is applied to the channel including the transport block, the maximum code block length Z of the transport block may be a value larger (or smaller) than a prescribed value. Additionally, for example, in a case that the frequency hopping is not applied to the channel including the transport block, the maximum code block length Z of the transport block may be a value smaller (or larger) than the prescribed value.

The maximum code block length Z of the transport block may be given based on a subcarrier spacing. For example, the maximum code block length Z of the transport block may be given based on the subcarrier spacing for the channel including the transport block. Additionally, the maximum code block length Z of the transport block may be the prescribed value in a case that the subcarrier spacing for the channel including the transport block is 15 kHz. Additionally, in a case that the subcarrier spacing for the channel including the transport block is not 15 kHz, the length may be a value other than the prescribed value. Here, the subcarrier spacing of the channel may be a subcarrier spacing in a signal waveform of a signal transmitted in the channel. Additionally, the subcarrier spacing for the channel may be the subcarrier spacing in the signal waveform of the signal transmitted in the channel. Additionally, one channel may include multiple subcarrier spacings.

The maximum code block length Z of the transport block may be given based on a TTI length (or a subframe length, the number of symbols) for the channel including the transport block. For example, in a case that the TTI length for the channel including the transport block is smaller than 1 ms, the maximum code block length Z of the transport block may be a value smaller than the prescribed value. Additionally, for example, in a case that the TTI length for the channel including the transport block is larger than 1 ms, the maximum code block length Z of the transport block may be a value larger than the prescribed value. Additionally, the maximum code block length Z of the transport block may be the prescribed value in a case that the number of symbols for the channel including the transport block is 14. Additionally, the maximum code block length Z of the transport block may be a value other than the prescribed value in a case that the number of symbols for the channel including the transport block is other than 14. Here, the TTI length (or the subframe length, the number of symbols) for the channel including the transport block may be a length of the channel in a time domain (the number of symbols). Additionally, the TTI length (or the number of symbols) of the channel including the transport block may be the length of the channel in the time domain (the number of symbols).

The maximum code block length Z of the transport block may be determined based on the signal waveform. For example, the maximum code block length Z of the transport block may be given based on the signal waveform of the channel including the transport block. For example, the maximum code block length Z of the transport block may be the prescribed value in a case that the signal waveform of the channel including the transport block is a prescribed signal waveform, and may be a value other than the prescribed value in a case that the signal waveform of the channel including the transport block is other than the prescribed signal waveform. Here, for example, the prescribed signal waveform may be the OFDM. Additionally, the prescribed signal waveform may be Discrete Fourier Transform spread OFDM (DFT-s-OFDM) (SC-FDMA).

The maximum code block length Z of the transport block may be given based on an error correction code applied to the transport block (for example, a type of the error correction code, a generator matrix size, a generator matrix generation method, a check matrix size, a check matrix generation method, a coding rate, presence or absence of an outer code, or the like). For example, the maximum code block length Z of the transport block may be the prescribed value in a case that the error correction code applied to the transport block is the turbo code, and may be a value other than the prescribed value in a case that the error correction code applied to the transport block is other than the turbo code. Additionally, the maximum code block length Z of the transport block may be the prescribed value in a case that a coding rate of the error correction code applied to the transport block is ⅓, and may be a value other than the prescribed value in a case that the coding rate of the error correction code applied to the transport block is other than ⅓. Additionally, for example, the maximum code block length Z of the transport block may be the prescribed value in a case that the outer code is not applied to the transport block, and may be a value other than the prescribed value in a case that the outer code is applied to the transport block.

Coding output of the LDPC code may be given by multiplying an information bit (for example, the transport block, the code block, or the like) by the generator matrix. Additionally, LDPC code decoding is performed based on the check matrix. For example, LDPC code decoding processing may be processing to which a belief propagation method is applied based on a graph that is generated based on the check matrix (for example, a factor graph, a Bayesian network, or the like). For example, in a case that the generator matrix is taken as $P_L$, and the check matrix is taken as $H_L$, $P_L$ and $H_L$ may be given so as to satisfy $P_L*H_L=0$. Here, $P_L$ and $H_L$ are matrices constituted of only 0 or 1. Additionally, $P_L*H_L$ is a matrix operation given by a logical product of $P_L$ and $H_L$. By a condition of $P_L*H_L=0$, in a case that the generator matrix $P_L$ is given, the check matrix $H_L$ is generated. Additionally, by the condition of $P_L*H_L=0$, in a case that the check matrix $H_L$ is given, the generator matrix $P_L$ is generated.

In the LDPC code (or another block code or the like), the code block size may be given by the size of the check matrix or the generator matrix. In other words, based on the size of the check matrix or the generator matrix, the code block size may be given. Additionally, based on the size of the check matrix or the generator matrix, the transport block size may be given. The check matrix or the generator matrix may be given based on the information included in the higher layer signaling. Additionally, the check matrix or the generator matrix may be given based on the information included in the control channel. Additionally, in the LDPC code (or another block code or the like), the size of the check matrix and/or the generator matrix may be given by the code block size. Additionally, in the LDPC code (or another block code or the like), the size of the check matrix and/or the generator matrix may be given by the transport block size.

The maximum code block length Z of the transport block may be given based on the number of the CRC bits attached to the transport block and/or the code block included in the transport block. For example, in a case that the CRC bit is attached to the transport block and/or the code block included in the transport block, the maximum code block length Z of the transport block may be the prescribed value. For example, in a case that the CRC bit is not attached to the transport block and the code block included in the transport block, the maximum code block length Z of the transport block may be a value other than the prescribed value. Additionally, for example, in a case that the CRC bits attached to the transport block and/or the code block included in the transport block are constituted from 24 bits, the maximum code block length Z of the transport block may be the prescribed value. Additionally, in a case that the CRC bits attached to the transport block and/or the code block included in the transport block are constituted from bits other than 24 bits, the maximum code block length Z of the transport block may be a value other than the prescribed value.

The maximum code block length Z may be given based on a duplex scheme applied to the serving cell. Additionally, the maximum code block length Z of the transport block may be given based on the duplex scheme applied to the serving cell for the channel including the transport block.

Here, the prescribed value may be 6144. Additionally, the prescribed value may be a value defined by a specification or the like, and known to both the terminal apparatus 1 and the base station apparatus 3. Additionally, the prescribed value may be given based on information transmitted from the base station apparatus 3. Additionally, the value other than the prescribed value may be a value smaller than the prescribed value. Additionally, the value other than the prescribed value may be a value larger than the prescribed value. Additionally, the prescribed value may be a value configured to the terminal apparatus 1 beforehand.

Here, the maximum code block length Z may be read as a code block length.

Code block lengths of the multiple code blocks generated from one transport block may be identical with one another among the code blocks. Additionally, the code block lengths of the multiple code blocks constituting one transport block may be different from one another among the code blocks. Here, the code block lengths of the multiple code blocks constituting one transport block are also referred to as a code block length.

The code block length may be a unit of the error correction coding. In other words, each of the code blocks may be subjected to the error correction coding. The following will describe processing, as an aspect of the present invention, based on an example in which each of the code blocks is subjected to the error correction coding. On the other hand, another aspect of the present invention may be based on processing in which the multiple code blocks are subjected to the error correction coding.

The code block output from the code block segmentation unit 4011 may be input to the CRC attachment unit 4012. The CRC attachment unit 4012 may generate a CRC bit based on the code block. Additionally, the CRC attachment unit 4012 may attach the generated CRC bit to the code block. Additionally, the CRC attachment unit 4012 may output a sequence ($c_{0k}$ to $c_{C'k}$) in which the CRC bit is attached to the code block. Here, in a case that code block segmentation is not applied (in a case of C'=1), the CRC attachment unit 4012 may not attach the CRC to the code block.

In the CRC attachment unit 4012, based on the information included in the higher layer signaling, the number of the CRC bits attached to the code block may be given. In the CRC attachment unit 4012, based on the information included in the control channel, the number of the CRC bits attached to the code block may be given. In the CRC attachment unit 4012, based on the information configured beforehand, the number of the CRC bits attached to the code block may be given. In the CRC attachment unit 4012, based on a type of the error correction coding, the number of the CRC bits attached to the code block may be given.

Each of the code blocks output from the CRC attachment unit 4012 is input to the error correction encoder unit 4002. In a case of C'>1, an input to the error correction encoder unit 4002 is a code block that is successively selected. In the following description, each one of the code blocks input to the error correction encoder unit 4002 ($C_{0k}$ to $C_{C'k}$) is also referred to as $C_k$.

The error correction encoder unit 4002 includes a function for applying the error correction coding to the code block $C_k$ that is input. For example, the error correction coding may be the turbo code, the LDPC code, the Polar code, the convolutional code (for example, the Tail biting convolutional code (TBCC) or the like), the Reed Muller (RM) code, the iteration code, the Reed Solomon code, a cyclic code, a parity check code, or the like. The error correction encoder unit 4002 may apply the error correction coding process to the code block $C_k$ and output a Coded bit. The coded bits to be output may be $d_k^{(0)}$, $d_k^{(1)}$, and $d_k^{(2)}$. Here, $d_k^{(0)}$ may be a systematic bit. Additionally, $d_k^{(1)}$ and $d_k^{(2)}$ may be parity bits. The coded bits are also referred to as a sub-block. The number of the sub-blocks output from the error correction encoder unit 4002 may not be three of $d_k^{(0)}$, $d_k^{(1)}$, and $d_k^{(2)}$, may be equal to or smaller than two or equal to or larger than four.

LDPC coding may be Quasi-Cyclic-Low Density Parity Check (QC-LDPC) coding. The LDPC coding may be Low Density Parity Check-Convolutional codes (LDPC-CC) coding. The LDPC coding may be a coding scheme by which a set of systematic bits $d_s$ and a set of parity bits $d_p$ is generated. Here, in a case that a scheme of the error correction code is an unsystematic code, the scheme may be a coding scheme by which a set of bits $d_s$ is generated.

The error correction encoder unit 4002 may include a function to map the bits $d_s$ and/or $d_p$ generated by the LDPC coding to $d_k^{(0)}$, $d_k^{(1)}$, and $d_k^{(2)}$. For example, in a case that the coding rate is ⅓, the systematic bits constituted of K bits and the parity bits constituted of 2K bits may be generated with respect to a code block length K. For example, the systematic bit $d_s$ (k) may be mapped to $d_k^{(0)}$, the parity bit $d_p$ (2k) may be mapped to $d_k^{(1)}$, and the parity bit $d_p$ (2k+1) may be mapped to $d_k^{(2)}$. Here, $d_s$ (k) is a k-th bit of the systematic bit $d_s$. Additionally, $d_p$ (k) is a k-th bit of the parity bit $d_p$. In other words, the bit generated by the LDPC code may be mapped based on the number of sub-block interleavers (or 3).

The coded bits output from the error correction encoder unit 4002 may be input to the sub-block interleaver unit 4003. The coded bits output from the error correction encoder unit 4002 may be input to the bit collection unit 4004. Whether the coded bits are input to the sub-block interleaver unit 4003 or to the bit collection unit 4004 may be given based on the information included in the higher layer signaling or the control channel. Whether the coded bits are input to the sub-block interleaver unit 4003 or to the bit collection unit 4004 may be given based on at least one of a symbol length, the signal waveform, the error correction code scheme, and the component carrier. The coded bits output from the error correction encoder unit 4002 being input to the sub-block interleaver unit 4003 means that the sub-block interleaver is applied to the coded bits. The coded bits output from the error correction encoder unit 4002 being input to the bit collection unit 4004 means that the sub-block interleaver is not applied to the coded bits.

The error correction code applied to the code block may be given based on the information included in the higher layer signaling. The error correction code applied to the code block may be given based on the information included in the control channel. The error correction code applied to the code block may be given based on the signal waveform for the channel including the code block. The error correction code applied to the code block may be given based on the subcarrier spacing for the channel including the code block. The error correction code applied to the code block may be given based on the information configured beforehand.

The coded bits may be input to the sub-block interleaver unit 4003. The sub-block interleaver unit 4003 may change an array of the coded bits. FIGS. 7A and 7B are diagrams illustrating an example of coded bits array change by the sub-block interleaver unit 4003 according to the present embodiment. The sub-block interleaver unit 4003 may map the coded bits to a two-dimensional block B. Here, the block B may be one-dimension, three-dimension, or three-dimension or more. For example, the block B may include a first axis and a second axis. Here, the first axis is also referred to as a horizontal axis or a column. The second axis is also referred to as a vertical axis or a row. In the block B, a point specified by a certain point of the first axis and a certain point of the second axis is also referred to as an element. Here, one element may be one coded bit (or may correspond to one coded bit). The sub-block interleaver unit 4003 may map (write) the coded bit while giving priority to the first axis. Here, a mapping method illustrated in FIG. 7A illustrates an example of the method for mapping while giving priority to the first axis. In other words, being mapped while giving priority to the first axis means being mapped based on the following procedures (or iteration based on the following procedures). (1) Mapping is performed on a point (a row) on the second axis in a first axis direction. (2) Mapping is performed on a next point on the second axis in the first axis direction.

For example, in a case that the first axis is a time axis and the second axis is a frequency axis, being mapped while giving priority to the first axis means being mapped while giving priority to the time axis (Time first mapping). On the other hand, being mapped while giving priority to the second axis means being mapped while giving priority to the frequency axis (Frequency first mapping).

Here, the number of columns of the first axis may be 32, the number of rows of the second axis may be the minimum integer value under a condition that the integer value is not lower than a value obtained by the coded bits being divided by 32. In a case that the coded bits are mapped while giving priority to the first axis, null (or a dummy bit) may be mapped to an element to which the coded bit is not mapped.

For example, the sub-block interleaver unit 4003 may include a function to apply different processing based on input. In a case that the input is $d_k^{(0)}$ or $d_k^{(1)}$, a Permutation pattern may not be applied to the block B. On the other hand, in a case that the input is $d_k^{(2)}$, the permutation pattern may be applied to the block B. In other words, in the sub-block interleaver unit 4003, the application of the permutation pattern may be changed based on the input coded bit. The application of the permutation pattern may be rearrangement processing of an order of the first axis. For example, the permutation pattern P may be P=[0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31].

For example, the sub-block interleaver unit 4003 may acquire (read) the coded bits that are mapped to the block B while giving priority to the second axis. Here, a mapping method illustrated in FIG. 7B illustrates an example of the method for mapping while giving priority to the second axis. The sub-block interleaver unit 4003 outputs reallocation bits (for example, $v_k^{(0)}$, $v_k^{(1)}$, and $v_k^{(2)}$) that are acquired while giving priority to the second axis.

For example, in a case that the coded bits are mapped while giving priority to the first axis and acquired while giving priority to the second axis, the order of the coded bits input to the sub-block interleaver unit 4003 and the reallocation bits is switched. In other words, the sub-block interleaver unit 4003 may include a function to switch the order of the coded bits and the reallocation bits. Here, in a case that the axis given priority in a case of mapping to the block B and the axis given priority in a case of acquiring from the block B are different from each other, an operation of the sub-block interleaver unit 4003 is also referred to as allocation switching (or, interleaving, reallocation, or the like). Note that, in a case that the axis given priority in a case of mapping to the block B and the axis given priority in a case of acquiring from the block B are identical to each other, the sub-block interleaver unit 4003 does not perform the allocation switching (the order of the coded bits input to the sub-block interleaver unit 4003 and the reallocation bits is not switched).

For example, whether or not the allocation switching of the coded bits by the sub-block interleaver unit 4003 is performed may be given based on the transport block size (or the number of the coded bits). For example, in a case that the transport block size $N_{TBS}$ satisfies $N_{TBS} > Z_t$, the allocation switching of the coded bits by the sub-block interleaver unit 4003 may be performed. Additionally, in a case that the transport block size $N_{TBS}$ satisfies $N_{TBS} \leq Z_t$, the allocation switching of the coded bits by the sub-block interleaver unit 4003 may not be performed. Additionally, whether or not the allocation switching of the coded bits by the sub-block interleaver unit 4003 is performed may be given based on the transport block size of the transport block including the coded bits and the modulation scheme (QPSK, 16QAM, 64QAM, or the like). Here, being given based on the transport block size and the modulation scheme may be being given based on a ratio of the transport block size to the modulation order of the modulation scheme applied to the transport block (or a value associated with the number of the modulation symbols). Additionally, whether or not the allocation switching of the coded bits by the sub-block interleaver unit 4003 is performed may be given based on a ratio of the transport block size of the transport block including the coded bits to the number of the resource elements of the channel including the transport block including the coded bits. Here, the transport block size of the transport block may be expressed by a total of at least one code block size generated from the transport block. Additionally, the number of the resource elements included in the channel including the transport block may be expressed by the number of resource elements allocated to the terminal apparatus 1, given by scheduling information (for example, in a case of downlink communication, it may be a downlink grant. In addition, in a case of uplink communication, it may be an uplink grant). Here, the number of the resource elements allocated to the terminal apparatus 1 may be given by the product of the number of allocated subcarriers and the number of allocated symbols. Additionally, the number of the resource elements allocated to the terminal apparatus 1 may be given as a value obtained by subtracting resource elements included in a prescribed region from the product of the number of the allocated subcarriers and the number of the allocated symbols. Here, the prescribed region may be a region in which the reference signal channel is included. Additionally, the prescribed region may be a region in which the synchronization channel is included.

For example, whether or not the allocation switching of the coded bits by the sub-block interleaver unit 4003 is performed may be given based on the component carrier (or a serving cell, a serving cell bandwidth, or the like). For example, whether or not the allocation switching of the coded bits by the sub-block interleaver unit 4003 is performed may be given based on the component carrier for the channel including the coded bits. Whether or not the allocation switching of the coded bits by the sub-block interleaver unit 4003 is performed may be given based on whether the serving cell for the channel including the coded bits is the primary cell or the secondary cell. Whether or not the allocation switching of the coded bits by the sub-block interleaver unit 4003 is performed may be given based on whether the serving cell for the channel including the coded bits is in the licensed band or in the unlicensed band.

Whether or not the allocation switching of the coded bits by the sub-block interleaver unit 4003 is performed may be given based on the ID of the serving cell. Whether or not the allocation switching of the coded bits by the sub-block interleaver unit 4003 is performed may be given based on the ID of the serving cell for the channel including the coded bits.

Whether or not the allocation switching of the coded bits by the sub-block interleaver unit 4003 is performed may be given based on whether or not the frequency hopping is applied to the channel including the coded bits. For example, in a case that the frequency hopping is applied to the channel including the coded bits, the allocation switching of the coded bits may be performed by the sub-block interleaver unit 4003. Additionally, for example, in a case that the frequency hopping is not applied to the channel including the coded bits, the allocation switching of the coded bits may not be performed by the sub-block interleaver unit 4003.

Whether or not the allocation switching of the coded bits by the sub-block interleaver unit 4003 is performed may be given based on the subcarrier spacing. For example, whether or not the allocation switching of the coded bits by the sub-block interleaver unit 4003 is performed may be given based on the subcarrier spacing for the channel including the coded bits. For example, in a case that the subcarrier spacing for the channel including the coded bits is 15 kHz, the allocation switching of the coded bits may be performed by the sub-block interleaver unit 4003. Additionally, in a case that the subcarrier spacing for the channel including the coded bits is not 15 kHz, the allocation switching of the coded bits may not be performed by the sub-block interleaver unit 4003.

Whether or not the allocation switching of the coded bits by the sub-block interleaver unit 4003 is performed may be given based on the TTI length (or the subframe length, the number of symbols) for the channel including the coded bits. For example, in a case that the TTI length for the channel including the coded bits is smaller than 1 ms, the allocation switching of the coded bits may be performed by the sub-block interleaver unit 4003. Additionally, in a case that the TTI length for the channel including the coded bits is larger than 1 ms, the allocation switching of the coded bits may not be performed by the sub-block interleaver unit 4003. Additionally, in a case that the TTI length for the channel including the coded bits is smaller than 1 ms, the allocation switching of the coded bits may not be performed by the sub-block interleaver unit 4003. Additionally, in a case that the TTI length for the channel including the coded bits is larger than 1 ms, the allocation switching of the coded bits may be performed by the sub-block interleaver unit 4003. Additionally, whether or not the allocation switching of the coded bits by the sub-block interleaver unit 4003 is performed may be given based on whether or not the number of the symbols for the channel including the coded bits is 14. For example, in a case that the number of the symbols of the channel including the coded bits is smaller than 14, the allocation switching of the coded bits may be performed by the sub-block interleaver unit 4003. Additionally, in a case that the number of the symbols of the channel including the coded bits is larger than 14, the allocation switching of the coded bits may not be performed by the sub-block interleaver unit 4003. Additionally, in a case that the number of the symbols of the channel including the coded bits is smaller than 14, the allocation switching of the coded bits may not be performed by the sub-block interleaver unit 4003. Additionally, in a case that the number of the symbols of the channel including the coded bits is larger than 14, the allocation switching of the coded bits may be performed by the sub-block interleaver unit 4003.

Whether or not the allocation switching of the coded bits by the sub-block interleaver unit 4003 is performed may be given based on the signal waveform. For example, whether or not the allocation switching of the coded bits by the sub-block interleaver unit 4003 is performed may be given based on the signal waveform for the channel including the coded bits. For example, in a case that the signal waveform of the channel including the coded bits is a prescribed signal waveform, the allocation switching of the coded bits may be performed by the sub-block interleaver unit 4003. Additionally, in a case that the signal waveform of the channel including the coded bits is a form other than the prescribed signal waveform, the allocation switching of the coded bits may not be performed by the sub-block interleaver unit 4003. Here, for example, the prescribed signal waveform may be the OFDM. Additionally, the prescribed signal waveform may be the DFT-s-OFDM (SC-FDMA).

Whether or not the allocation switching of the coded bits by the sub-block interleaver unit 4003 is performed may be given based on the error correction code applied to the transport block including the coded bits (for example, the type of the error correction code, the check matrix size, the check matrix generation method, the coding rate, presence or absence of the outer code, or the like). For example, in a case that the error correction code applied to the transport block including the coded bits is the turbo code, the allocation switching of the coded bits may be performed by the sub-block interleaver unit 4003. Additionally, in a case that the error correction code applied to the transport block including the coded bits is a code other than the turbo code, the allocation switching of the coded bits may not be performed by the sub-block interleaver unit 4003. Additionally, in a case that the coding rate of the error correction code applied to the transport block including the coded bits is ⅓, the allocation switching of the coded bits may be performed by the sub-block interleaver unit 4003. Additionally, in a case that the coding rate of the error correction code applied to the transport block including the coded bits is a rate other than ⅓, the allocation switching of the coded bits may not be performed by the sub-block interleaver unit 4003. Additionally, in a case that the outer code is not applied to the transport block including the coded bits, the allocation switching of the coded bits may be performed by the sub-block interleaver unit 4003. Additionally, in a case that the outer code is applied to the transport block including the coded bits, the allocation switching of the coded bits may not be performed by the sub-block interleaver unit 4003.

Whether or not the allocation switching of the coded bits by the sub-block interleaver unit 4003 is performed may be given based on the number of CRC bits attached to the transport block including the coded bits and/or the code block used for generation of the coded bits. For example, in a case that the CRC bit attached to the transport block including the coded bits and/or the code block used for generation of the coded bits is attached, the allocation switching of the coded bits may be performed by the sub-block interleaver unit 4003. Additionally, in a case that the CRC bit to be attached to the transport block including the coded bits and/or the code block used for generation of the coded bits is not attached, the allocation switching of the coded bits may not be performed by the sub-block interleaver unit 4003. Additionally, in a case that the CRC bits attached to the transport block including the coded bits and/or the code block used for generation of the coded bits are constituted from 24 bits, the allocation switching of the coded bits may be performed by the sub-block interleaver unit 4003. Additionally, in a case that the CRC bits attached to the transport block including the coded bits and/or the code block used for generation of the coded bits are constituted from bits other than 24 bits, the allocation switching of the coded bits may not be performed by the sub-block interleaver unit 4003.

For example, whether or not the allocation switching of the coded bits by the sub-block interleaver unit 4003 is performed may be given based on the duplex scheme for the serving cell. Additionally, whether or not the allocation switching of the coded bits by the sub-block interleaver unit 4003 is performed may be given based on the duplex scheme applied to the serving cell for the channel including the transport block including the coded bits.

Here, the axis given priority for mapping in the allocation switching of the coded bits may be the time axis (Time first mapping). Additionally, the axis given priority for mapping in the allocation switching of the coded bits may be the frequency axis (Frequency first mapping).

For example, the reallocation bit may be input to the bit collection unit 4004. The bit collection unit 4004 may include a function to generate a Virtual circular buffer based on the reallocation bit. The virtual circular buffer $w_k$ may be generated based on $w_k = v_k^{(0)}$, $w_{K_\Pi + 2k} = v_k^{(1)}$, and $w_{K_\Pi + 2k + 1} = v_k^{(2)}$. Here, $K_\Pi$ is the number of elements in the entire block B, $K_w$ is a value indicated by $K_w = 3 K_\Pi$. The bit collection unit 4004 outputs the virtual circular buffer $w_k$.

For example, the virtual circular buffer may be input to the bit selection and pruning unit 4005. Additionally, the bit selection and pruning unit 4005 may include a function to select a bit in the virtual circular buffer based on the number of radio resources. Here, the number of radio resources may be the number of resource elements given based on the scheduling information. Here, the number of the resource elements may be given by the product of the number of allocated subcarriers and the number of allocated symbols. The number of the allocated subcarriers or the number of the allocated symbols may be given based on information included in the downlink control information transmitted from the base station apparatus 3. Additionally, the number of the resource elements may be given as a value obtained by subtracting resource elements included in a prescribed region from the product of the number of the allocated subcarriers and the number of the allocated symbols. Here, the prescribed region may be a region in which the reference signal channel is included. Additionally, the prescribed region may be a region in which the synchronization channel is included. Additionally, the bit selection in the virtual circular buffer may be performed by taking an index $k_0$ as a start point, and circularly acquiring a bit in the virtual circular buffer $w_k$. Here, the acquired bit is also referred to as $e_k$. The bit selection and pruning unit 4005 outputs $e_k$. For example, $k_0$ may be expressed by $k_0 = 32 \ast (2 \ast \text{Ceil}(N_{cb}/(8 \ast R^{TC})) \ast rv_{idx} + 2)$. Here, Ceil(*) is a function to obtain the minimum integer under a condition that the integer is not lower than *. Additionally, $rv_{idx}$ is a Redundancy version. The redundancy version is determined by MCS information and/or a New Data Indicator (NDI) included in the downlink control information transmitted from the base station apparatus 3. $N_{cb}$ is a soft buffer size. $N_{cb}$ may be $N_{cb} = \min(\text{floor}(N_{IR}/C'), K_w)$ in a case of downlink communication, and may be $N_{cb} = K_w$ in a case of uplink communication. Here, min(A, B) is a function in which a smaller one of A and B is selected. Additionally, floor(*) is a function that outputs the maximum integer that does not exceed *.

For example, $e_k$ may be input to the concatenation unit 4006. Additionally, the concatenation unit 4006 may include a function to concatenate C' code blocks and generate a concatenation bit. The concatenation bit is also referred to as $f_k$.

Hereinafter, a method of setting the transmission power for transmission of the uplink physical channel will be described below.

For example, transmission power $P_{PUSCH,c}(i)$ for transmission of the uplink physical channel in a sub-frame i in a serving cell c may be given by the following Equation (1). In other words, the transmission power $P_{PUSCH,c}(i)$ for transmission of the uplink physical channel may be given based on some or all of multiple parameters included in the following Equation (1).

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} \, [\text{dBm}] \quad \text{Equation 1}$$

where, $P_{CMAX,c}(i)$ is the configured UE transmit power in subframe i for serving cell c.

$M_{PUSCH,c}(i)$ is the bandwidth of the PUSCH resource assignment expressed in number of resource blocks valid for subframe i and serving cell c.

$P_{O\_PUSCH,c}(j)$ is a parameter composed of the sum of a component $P_{O\_NOMINAL\_PUSCH,c}(j)$ provided from higher layers and a component $P_{O\_UE\_PUSCH,c}(j)$ Provided by higher layers for serving cell c.

$\alpha_c \in \{0, 0.4, 0.5, 0.6, 0.7, 0.8, 0.9, 1\}$ is a 3-bit parameter provided by higher layers for serving cell c.

$PL_c$ is the downlink path loss estimate calculated in the UE for serving cell c in dB.

$f_c(i)$ is derived from a TPC command which is included in PDCCH/EPDCCH with DCI format for the serving cell c.

Here, min( ) is a function that returns the minimum value among input multiple values. $P_{CMAX,c}(i)$ is the maximum transmission power of the terminal apparatus 1 configured in the subframe i in the serving cell c. $M_{PUSCH,c}(i)$ is a PUSCH resource allocation bandwidth in the subframe i in the serving cell c. The PUSCH resource allocation bandwidth is expressed by the number of resource blocks. $P_{O\_PUSCH,c}(j)$ is given based on two parameters provided by the higher layer. $\alpha_c$ is given by the parameter given by the higher layer. $PL_c$ is a downlink path loss estimation value, which is calculated by the terminal apparatus 1, for the serving cell c. Furthermore, $f_c(i)$ is derived from a Transmission Power Control (TPC) command. The TPC command may be included in the downlink control information for the serving cell c. Additionally, $\Delta_{TF, c}$ in Equation (1) may be given by the following Equation (2).

$$\Delta_{TF,c}(i) = \begin{cases} 0 & \text{for } K_s = 0 \\ 10\log_{10}((2^{BPRE \cdot K_s} - 1) \cdot \beta_{offset}^{PUSCH}) & \text{for } K_s \neq 0 \end{cases} \quad \text{Equation 2}$$

where
$\beta_{offset}^{PUSCH} = \beta_{offset}^{CQI}$ for set for control data (UCI) sent via PUSCH without UL-SCH data (transport block) and 1 for other cases.

In a case that the UCI is transmitted via the PUSCH that does not include the transport block, $\beta_{offset}^{PUSCH}$ is given by $\beta_{offset}^{CQI}$. Here, $\beta_{offset}^{CQI}$ may be given by the information/parameter received from the base station apparatus 3. In a case that the transport block is at least transmitted via the PUSCH, $\beta_{offset}^{PUSCH}$ is 1. BPRE in Equation (2) is given by the following Equation (3). The BPRE is a ratio of the transport block size before the coding to the number of the resource elements to which the uplink physical channel corresponds. In other words, the BPRE is the number of bits of the transport block before the coding per one resource element to which the uplink physical channel corresponds. Here, the number of the resource elements to which the uplink physical channel corresponds may be the number of the resource elements to which the uplink physical channel is mapped.

$$BPRE = \begin{cases} O_{CQI}/N_{RB} & \text{for control data } (UCI) \text{ sent via PUSCH} \\ & \text{without } UL\text{-}SCH \text{ data (transport block)} \\ \sum_{r=0}^{C'-1} K_r/N_{RE} & \text{for other case} \end{cases} \quad \text{Equation 3}$$

where
C' and $K_r$ are obtained from the initial PDCCH for the same transport block, and
$0_{CQI}$ is the number of CQI/PMI bits including CRC parity bits.
$N_{RE}$ is the number of resource elements determined as $N_{RE} = M_{SC}^{PUSCH\text{-}initial} \cdot N_{symb}^{PUSCH\text{-}initial}$.
$O_{CQI}$ is the number of bits of CQI/PMI including the CRC parity bit. $N_{RE}$ is the number of the resource elements to which the uplink physical channel corresponds. C' is the number of the code blocks. $K_r$ is a size of a code block r. $N_{RE}$ is the product of $M_{SC}^{PUSCH\text{-}initial}$ and $N_{symb}^{PUSCH\text{-}initial}$. $M_{SC}^{PUSCH\text{-}initial}$ is a bandwidth scheduled for PUSCH initial transmission, and can be obtained from an initial PDCCH for the same transport block. $M_{SC}^{PUSCH\text{-}initial}$ may be expressed by the number of subcarriers. $N_{symb}^{PUSCH\text{-}initial}$ is the number of SC-FDMA symbols for the PUSCH initial transmission for the same transport block.

$K_s$ in Expression (2) may be given based on at least some or all of the following first element to ninth element. In other words, the transmission power $P_{PUSCH, c}(i)$ for transmission of the uplink physical channel may be given based on at least some or all of the following first element to ninth element.

First Element: the error correction coding scheme applied to the transport block of the uplink physical channel Second Element: the size of the generator matrix applied to the LDPC coding of the transport block of the uplink physical channel for the LDPC coding (a row size and/or a column size)

Third Element: the size of the check matrix applied to the LDPC decoding of the transport block of the uplink physical channel for the LDPC coding (a row size and/or a column size)

Fourth Element: the length of the symbol (for example, the OFDM symbol or the SC-FDMA symbol) of the uplink physical channel Fifth Element: the signal waveform (for example, the OFDM, the DFT-s-OFDM, or the SC-FDMA) of the uplink physical channel Sixth Element: a subcarrier spacing of the uplink physical channel Seventh Element: the maximum code block length Z of the transport block of the uplink physical channel Eighth Element: the configuration of the component carrier by which the uplink physical channel is transmitted Ninth Element: the higher layer parameter The configuration of the component carrier in the eighth element may include at least one of a component carrier bandwidth, a component carrier center frequency, a band to which the component carrier belongs, and a component carrier (serving cell) ID (a PCID, a VCID).

The base station apparatus 3 may transmit information indicating the higher layer parameter in the ninth element to the terminal apparatus 1. The higher layer parameter in the ninth element may indicate validity or invalidity of $K_s$. For example, in a case that the higher layer parameter in the ninth element indicates the validity of $K_s$, $K_s$ may be given based on at least some or all of the above-described first element to eighth element. For example, in a case that the higher layer parameter in the ninth element indicates the invalidity of $K_s$, $K_s$ may be given regardless of the above-described first element to eighth element. For example, in a case that the higher layer parameter in the ninth element indicates the invalidity of $K_s$, $K_s$ may be set to 0. In other words, the higher layer parameter in the ninth element may indicate whether or not $K_s$ is 0.

For example, in a case that the error correction coding scheme applied to the transport block of the uplink physical channel is the turbo coding, $K_s$ may be a first value. For example, in a case that the error correction coding scheme applied to the transport block of the uplink physical channel is the LDPC coding, $K_s$ may be a second value. Here, the first value may be 1.25. Here, the second value may be 1.

For example, in a case that the size of the generator matrix applied to the LDPC coding of the transport block of the uplink physical channel (the row size and/or the column size) is smaller than or the same as a prescribed threshold value, $K_s$ may be the first value. For example, in a case that the size of the generator matrix applied to the LDPC coding of the transport block of the uplink physical channel (the row size and/or the column size) is larger than the prescribed threshold value, $K_s$ may be the second value. Here, the first value may be 1.25. Here, the second value may be 1.

Hereinafter, various aspects of the terminal apparatus 1 and the base station apparatus 3 according to the present embodiment will be described.

(1) A first aspect of the present embodiment is a terminal apparatus 1, the terminal apparatus 1 includes: a transmitter 107 configured to transmit an uplink physical channel including a transport block; a coding unit 1071 configured to code the transport block; and a transmission power control unit 1015 configured to set transmission power to transmit the uplink physical channel based on at least the product of a ratio Bit Per Resource Element (BPRE) of the number of bits of the transport block to the number of resource elements to which the uplink physical channel corresponds and a parameter $K_s$, in which a value of the parameter $K_s$ is given based on at least some or all of the above-described first element to eighth element.

(2) In the first aspect of the present embodiment, the error correction coding scheme includes at least two of LDPC coding, turbo coding, Polar coding, convolutional coding, block coding, RM coding, Reed Solomon coding, iteration coding.

(3) In the first aspect of the present embodiment, the terminal apparatus 1 includes a receiver 105 configured to receive information indicating a higher layer parameter, in a case that the higher layer parameter indicates invalidity of $K_s$, regardless of the first element and the second element, $K_s$ is set to 0.

(3) A second aspect of the present embodiment is a base station apparatus 3, the base station apparatus 3 includes: a receiver 305 configured to receive an uplink physical channel including a transport block; and a decoding unit 3051 configured to decode the transport block, in which transmission power to transmit the uplink physical channel is set based on at least the product of a ratio Bit Per Resource Element (BPRE) of the number of bits of the transport block to the number of resource elements to which the uplink physical channel corresponds and a parameter $K_s$, and a value of the parameter $K_s$ is given based on at least some or all of the above-described first element to eighth element.

(4) In the second aspect of the present embodiment, the error correction coding scheme includes at least two of LDPC coding, turbo coding, Polar coding, convolutional coding, block coding, RM coding, Reed Solomon coding, iteration coding.

(5) In the second aspect of the present embodiment, the base station apparatus 3 includes a transmitter 307 configured to transmit information indicating a higher layer parameter, in a case that the higher layer parameter indicates invalidity of $K_s$, regardless of the first element and the second element, $K_s$ is set to 0.

(1A) According to some aspects of the present invention, the following measures are provided. That is, a first aspect of the present invention is a terminal apparatus, the terminal apparatus includes a transmitter configured to transmit an uplink physical channel including a transport block, and a transmission power control unit configured to set transmission power to transmit the uplink physical channel based on at least a first element and/or a second element described below.

First Element: a signal waveform of the uplink physical channel

Second Element: a subcarrier spacing of the uplink physical channel (2A) A second aspect of the present invention is a base station apparatus, the base station apparatus includes a receiver configured to receive an uplink physical channel including a transport block, and a decoding unit configured to decode the transport block, in which transmission power to transmit the uplink physical channel is given based on at least a first element and/or a second element described below.

First Element: a signal waveform of the uplink physical channel

Second Element: a subcarrier spacing of the uplink physical channel (3A) A third aspect of the present invention is a communication method used for a terminal apparatus, the communication method includes the steps of transmitting an uplink physical channel including a transport block, and setting transmission power to transmit the uplink physical channel based on at least a first element and/or a second element described below.

First Element: a signal waveform of the uplink physical channel

Second Element: a subcarrier spacing of the uplink physical channel (4A) A fourth aspect of the present invention is a communication method used for a base station apparatus, the communication method includes the steps of receiving an uplink physical channel including a transport block, and decoding the transport block, in which transmission power to transmit the uplink physical channel is given based on at least a first element and/or a second element described below.

First Element: a signal waveform of the uplink physical channel

Second Element: a subcarrier spacing of the uplink physical channel (5A) The signal waveform of the uplink physical channel includes OFDM and DFT-spread-OFDM.

With this configuration, information is efficiently transmitted between the terminal apparatus 1 and the base station apparatus 3.

The base station apparatus 3 according to the present embodiment can also be realized as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on an apparatus according to an aspect of the present invention may serve as a program that controls a Central Processing Unit (CPU) and the like to cause a computer to operate in such a manner as to realize the functions of the above-described embodiment according to an aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiment. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, for an aspect of the present invention, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be used, for example, in a communication system, a communication apparatus (for example, a mobile phone device, a base station apparatus, a wireless LAN apparatus, or a sensor device), an integrated circuit (for example, a communication chip), a program, or the like.

REFERENCE SIGNS LIST 1 (1A, 1B, 1C) Terminal apparatus
3 Base station apparatus
101 Higher layer processing unit
103 Controller
105 Receiver
107 Transmitter
301 Higher layer processing unit
303 Controller
305 Receiver
307 Transmitter
1011 Radio resource control unit
1013 Scheduling unit
1015 Transmission power control unit
3011 Radio resource control unit
3013 Scheduling unit
3015 Transmission power control unit

The invention claimed is:

1. A terminal apparatus comprising:
transmission circuitry configured to transmit uplink information on an uplink physical channel;
coding circuitry configured to encode the uplink information; and
transmission power control circuitry configured to set transmission power for the uplink physical channel, at least based on a parameter, wherein
in a case that a first error correction encoding method is applied to the uplink information, the parameter is given at least based on a product of a first value and a first number of bits before coding per resource element;
in a case that a second error correction encoding method is applied to the uplink information, the parameter is given at least based on a product of a second value and a second number of bits before coding per resource element, the second value being different from the first value, and the second error correction encoding method being different from the first error correction encoding method;
the first value and the second value correspond to a first error correction encoding method and a second error correction encoding method, respectively; and
the first error correction encoding method and the second error correction encoding method are selected from a predetermined set.

2. A base station apparatus comprising:
reception circuitry configured to receive uplink information on an uplink physical channel; and
decoding circuitry configured to decode the uplink information, wherein
the uplink information is decoded at least based on a parameter used for determining transmission power for transmitting the uplink information,
in a case that a first error correction decoding method is applied to the uplink information, the parameter is given at least based on a product of a first value and a first number of bits before coding per resource element;
in a case that a second error correction decoding method is applied to the uplink information, the parameter is given at least based on a product of a second value and a second number of bits before coding per resource element, the second value being different from the first value, and the second error correction encoding method being different from the first error correction encoding method;
the first value and the second value correspond to a first error correction encoding method and a second error correction encoding method, respectively; and
the first error correction encoding method and the second error correction encoding method are selected from a predetermined set.

3. A communication method used for a terminal apparatus, the communication method comprising the steps of:
transmitting uplink information on an uplink physical channel;
encoding the uplink information; and
setting transmission power for the uplink physical channel, at least based on a parameter, wherein
in a case that a first error correction encoding method is applied to the uplink information, the parameter is given at least based on a product of a first value and a first number of bits before coding per resource element;
in a case that a second error correction encoding method is applied to the uplink information, the parameter is given at least based on a product of a second value and a second number of bits before coding per resource element, the second value being different from the first value, and the second error correction encoding method being different from the first error correction encoding method;
the first value and the second value correspond to a first error correction encoding method and a second error correction encoding method, respectively; and
the first error correction encoding method and the second error correction encoding method are selected from a predetermined set.

4. A communication method used for a terminal apparatus, the communication method comprising the steps of:
receiving uplink information on an uplink physical channel; and
decoding the uplink information, wherein
the uplink information is decoded at least based on a parameter used for determining transmission power for transmitting the uplink information,
in a case that a first error correction decoding method is applied to the uplink information, the parameter is given at least based on a product of a first value a first number of bits before coding per resource element;
in a case that a second error correction decoding method is applied to the uplink information, the parameter is given at least based on a product of a second value and a second number of bits before coding per resource element, the second value being different from the first value, and the second error correction encoding method being different from the first error correction encoding method;
the first value and the second value correspond to a first error correction encoding method and a second error correction encoding method, respectively; and
the first error correction encoding method and the second error correction encoding method are selected from a predetermined set.

* * * * *